US012476058B2

(12) United States Patent
Kao

(10) Patent No.: US 12,476,058 B2
(45) Date of Patent: Nov. 18, 2025

(54) UPPER CONTACT ASSEMBLY AND FUSE CUTOUT HAVING THE SAME

(71) Applicant: GOODWELL ELECTRIC CORPORATION, Taipei (TW)

(72) Inventor: Sui-Chan Kao, Taipei (TW)

(73) Assignee: GOODWELL ELECTRIC CORPORATION, Taipei (TW)

( * ) Notice: Subject to any disclaimer, the term of this patent is extended or adjusted under 35 U.S.C. 154(b) by 149 days.

(21) Appl. No.: 18/389,561

(22) Filed: Nov. 14, 2023

(65) Prior Publication Data

US 2025/0079098 A1 Mar. 6, 2025

(30) Foreign Application Priority Data

Sep. 6, 2023 (TW) ................................ 112133817

(51) Int. Cl.
*H01H 31/12* (2006.01)

(52) U.S. Cl.
CPC ................................ *H01H 31/127* (2013.01)

(58) Field of Classification Search
CPC ....... H01H 9/102; H01H 9/104; H01H 31/127
USPC ...................................................... 337/9, 180
See application file for complete search history.

(56) References Cited

U.S. PATENT DOCUMENTS 2,630,508 A * 3/1953 Meisenheimer ..... H01H 31/125 337/217
2,692,315 A * 10/1954 Hubbard ............. H01H 31/127 337/167
2,734,964 A * 2/1956 Edwards et al. .............. 337/180
3,041,426 A * 6/1962 Baker .................. H01H 31/127 337/250
4,546,341 A * 10/1985 McNaghten ......... H01H 31/125 337/217
4,768,010 A * 8/1988 Brown ................. H01H 31/127 361/115
6,922,132 B2 * 7/2005 Montante ............ H01H 31/127 337/171
7,532,103 B2 * 5/2009 Almgren ............. H01H 31/127 337/171
9,349,501 B2 * 5/2016 Miyamoto ............. H01H 33/64
10,818,407 B2 * 10/2020 Di-Gianni ................ H01B 3/40
(Continued)

FOREIGN PATENT DOCUMENTS

CN 1085348 A * 4/1994 ............... H01H 9/32

OTHER PUBLICATIONS

CN-1085348-A English translation (Year: 1994).*

*Primary Examiner* — Anatoly Vortman

(57) ABSTRACT

An upper contact assembly is disclosed, which comprises a metal member, and an electrically conductive (EC) plate provided with an aperture thereon, a sheet metal spring, and a support unit are disposed in the accommodation space. Moreover, the sheet metal spring contacts with a bottom of the EC plate, and a protrusion block of the EC plate is exposed out of the metal member via the aperture. In addition, a hollow cylindrical (HC) conductor is vertically disposed on the top of the metal member, thereby being in contact with the protrusion block. As such, the HC conductor, the protrusion block, the EC plate, and the sheet metal spring are formed with an electrical transmission path therebetween, such that an electric wire is allowed to conduct a high-power electrical transmission through the ET path after being connected to a second end of the HC conductor.

11 Claims, 9 Drawing Sheets

(56) References Cited

U.S. PATENT DOCUMENTS

| | | | | |
|---|---|---|---|---|
| 11,488,794 | B1 * | 11/2022 | Kao | H01H 85/303 |
| 11,508,538 | B1 * | 11/2022 | Kao | H01H 85/38 |
| 11,776,771 | B2 * | 10/2023 | Kao | H01H 31/125<br>337/9 |
| 2023/0238195 | A1 * | 7/2023 | Kao | H01H 9/104<br>337/9 |

* cited by examiner

UPPER CONTACT ASSEMBLY AND FUSE CUTOUT HAVING THE SAME

BACKGROUND OF THE INVENTION

1. Field of the Invention

The present invention relates to the technology field of fuse cutout, and more particularly to an upper contact assembly for integration in a fuse cutout.

2. Description of the Prior Art

In electrical distribution, a fuse cutout or cut-out fuse (often referred to as a cutout) is a combination of a fuse and a switch, used in primary overhead feeder lines and taps to protect distribution transformers from current surges and overloads. FIG. 1 and FIG. 2 illustrates a side view and a stereo diagram of a conventional fuse cutout, respectively. With reference to FIG. 1 and FIG. 2, the conventional fuse cutout 1*a* comprises: an insulator 11*a*, a fuse tube assembly 12*a*, an upper contact member 13*a*, a upper terminal unit 14*a*, a sheet metal spring 10*a*, a lower contact assembly 17*a*, a lower terminal unit 16*a*, and a mounting member 18*a*, of which the fuse tube assembly 12*a* comprises a tube 120*a*, a conductor head 121*a* connected to a top end of the tube 120*a*, a pivotal connection unit 122*a* disposed on the tube 120*a*, and a lead wire accommodated in the tube 120*a*.

When making the fuse cutout 1*a* be in connection with a distribution transformer, the upper terminal unit 14*a* is connected to an overhead feeder line, and the lower terminal unit 16*a* is connected to a primary side of the distribution transformer. As such, an electric power is transmitted from the upper terminal unit 14*a* to the sheet metal spring 10*a* via the upper contact member 13*a*. Subsequently, the sheet metal spring 10*a* transmits the electric power to the fuse wire via the first conductor head 121*a*, and then the fuse wire transmits the electric power to the lower terminal unit 16*a* via the lower contact assembly 17*a*.

As described in more detail below, the upper terminal unit 14*a* comprises a first bolt 141*a*, a first pushing member 142*a* and a first screw nut 143*a*, and the lower terminal unit 16*a* consists of a mounting plate 160*a*, a second bolt 161*a*, a second pushing member 162*a*, and a second screw nut 163*a*. As FIG. 1 and FIG. 2 show, the sheet metal spring 10*a* consists of a first segment 101*a*, a second segment 102*a* and a third segment 103*a*, in which the first segment 101*a* and the second segment 102*a* are attached to the upper contact member 13*a*, and the third segment 103*a* is in connection with the conductor head 121*a*. When connecting the overhead feeder line to the upper terminal unit 14*a*, the overhead feeder line is disposed between the first pushing member 142*a* and the first screw nut 143*a*, such that the overhead feeder line is tightly clamped by the first pushing member 142*a* and the first segment 101*a* after driving the first pushing member 142*a* to push the overhead feeder line by screwing the first screw nut 143*a*. On the other hand, when connecting an electrical cable to the lower terminal unit 16*a*, the electrical cable is disposed between the second pushing member 162*a* and the second screw nut 163*a*, such that the electrical cable is tightly clamped by the second pushing member 162*a* and the mounting plate 160*a* after driving the second pushing member 162*a* to push the electrical cable by screwing the second screw nut 163*a*.

Practical experiences have indicated that, the upper terminal unit 14*a* is limited in power transmission capability due to the constitution thereof. Specifically, there is a certain extent of power loss occurring as the electric power is transmitted from the upper terminal unit 14*a* to the sheet metal spring 10*a*. In other words, it is worth considering that how to significantly enhance the power transmission capability of the upper terminal unit 14*a*, so as to reduce and/or cancel the power loss occurring in the transmission of the electric power.

According to above descriptions, it is understood that there is still room for improvement in the upper terminal unit 14*a* of the conventional fuse cutout 1*a*. In view of this fact, inventors of the present application have made great efforts to make inventive research and eventually provided an upper contact assembly for integration in a fuse cutout.

SUMMARY OF THE INVENTION

The primary objective of the present invention is to disclose an upper contact assembly for integration in a fuse cutout. The upper contact assembly comprises: a metal member, an electrically conductive (EC) plate, a sheet metal spring, a support unit, and a hollow cylindrical (HC) conductor, in which the metal member has an accommodation space, and the EC plate, the sheet metal spring, and a supporting member of the support unit are disposed in the accommodation space. Moreover, the sheet metal spring is set to be in contact with a bottom of the EC plate, and the metal member is provided with an aperture on a top thereof, such that a protrusion block of the EC plate is exposed out of the metal member via the aperture. On the other hand, the HC conductor is vertically disposed on the top of the metal member, so as to be in contact with the protrusion block by a first end thereof. As such, the HC conductor, the protrusion block, the EC plate, and the sheet metal spring are formed with an electrical transmission path therebetween, such that an electric wire is allowed to conduct a high-power electrical transmission through the ET path after being connected to a second end of the HC conductor.

For achieving the primary objective mentioned above, the present invention provides an embodiment of the upper contact assembly, comprising:

- a metal member, comprising a bottom plate provided with an aperture thereon and two side plates connected to the bottom plate, wherein a bottom surface of the bottom plate and the two side plates are formed with a first accommodation space therebetween, and the aperture being in communication with the first accommodation space;
- an electrically conductive plate provided with a first protrusion block thereon, being disposed in the first accommodation space, and being attached to the bottom surface of the metal member so as to make the first protrusion block be exposed out of the bottom plate via the aperture; wherein the first protrusion block is formed with a first screw hole therein, and the first screw hole passes through the first protrusion block and the electrically conductive plate;
- a sheet metal spring, comprising a first segment and a second segment, wherein the first segment contacts with a bottom surface of the electrically conductive plate, and is provided with a first through hole thereon;
- a support unit, comprising a support member and two hook-like members, wherein the support member is formed with a second screw hole therein, and the second screw hole passes through the support member;
- a hollow cylindrical conductor having a first end and a second end, being disposed to be in contact with the first protrusion block by the first end thereof, wherein the second end is adapted for being connected to an electric wire;

wherein an upper electrically conductive member of the fuse cutout is disposed on the support member, the upper electrically conductive member is provided with a third screw hole therein, and the third screw hole passes through the upper electrically conductive member;

wherein after driving a bolt to pass through the second screw hole of the support member, the first through hole of the first segment, and the first screw hole in turns so as to be further inserted into the first end of the hollow cylindrical conductor, the hollow cylindrical conductor, the first protrusion block, the electrically conductive plate, and the first segment are formed with an electrical transmission path therebetween.

In one embodiment, the sheet metal spring further comprises a slant segment connected between the first segment and the second segment, and the slant segment has a tilt angle.

In one embodiment, the bottom plate has a first protrusion portion formed on the bottom surface thereof, and a top surface and a bottom surface of the second segment are formed with a second protrusion portion and a first recess thereon, respectively.

In one embodiment, a compression spring is connected between the first protrusion portion and the second protrusion portion, and the first recess is adapted for receiving a conductor head of a fuse tube assembly of the fuse cutout.

In one practicable embodiment, the upper contact assembly further comprises an upper cover, which comprises:

an accommodation body having a second accommodation space;

a ferrule, being disposed on a top surface of the accommodation body, and being in communication with the second accommodation space;

a first hallow cylinder member, being disposed on the top surface of the accommodation body, so as to communicate with the second accommodation space by a first opening thereof; and a second hallow cylinder member, being disposed on a side surface of the accommodation body, and being in communication with the second accommodation space;

wherein the metal member, the electrically conductive plate, the sheet metal spring, the support member of the support unit, and the compression spring are positioned in the second accommodation space, and the hollow cylindrical conductor is disposed in the first hallow cylinder member;

wherein the second hallow cylinder member is adapted for being connected to an upper connection portion of an insulator of the fuse cutout.

In one embodiment, the ferrule is covered by a cap cover.

In one embodiment, the bottom plate is provided with a second recess thereon, and a second through hole is formed in the second recess to communicate with the first accommodation space.

In one embodiment, the second segment is provided with a third through hole, and the third through hole passes through the first recess and the second protrusion portion.

In one practicable embodiment, the upper contact assembly further comprises a limit unit, which comprises:

a rod member;

a head member connected to a top of the rod member; and a pin member connected to a tail of the rod member;

wherein the pin member is inserted into the third through hole, the rod member passes through the second through hole, and the head member is positioned in the second recess.

In one embodiment, the rod member has a first diameter, and the pin member has a second diameter smaller than the first diameter.

In addition, the present invention also provides an embodiment of a fuse cutout, which comprises an insulator, a fuse tube assembly, an upper contact assembly connected to an upper connection portion of the insulator, a lower contact assembly connected to a lower connection portion of the insulator, a lower terminal unit, and a mounting member; characterized in that said upper contact assembly comprises:

a metal member, comprising a bottom plate provided with an aperture thereon and two side plates connected to the bottom plate, wherein a bottom surface of the bottom plate and the two side plates are formed with a first accommodation space therebetween, and the aperture being in communication with the first accommodation space;

an electrically conductive plate provided with a first protrusion block thereon, being disposed in the first accommodation space, and being attached to the bottom surface of the metal member so as to make the first protrusion block be exposed out of the aperture; wherein the first protrusion block is formed with a first screw hole therein, and the first screw hole passes through the first protrusion block and the electrically conductive plate;

a sheet metal spring, comprising a first segment and a second segment, wherein the first segment contacts with a bottom surface of the electrically conductive plate, and is provided with a first through hole thereon;

a support unit, comprising a support member and two hook-like members, wherein the support member is formed with a second screw hole therein, and the second screw hole passes through the support member;

a hollow cylindrical conductor having a first end and a second end, being disposed to be in contact with the first protrusion block by the first end thereof, wherein the second end is adapted for being connected to an electric wire;

wherein an upper electrically conductive member extends out of the upper connection portion so as to be disposed on the support member, the upper electrically conductive member is provided with a third screw hole therein, and the third screw hole passes through the upper electrically conductive member;

wherein after driving a bolt to pass through the second screw hole of the support member, the first through hole of the first segment, and the first screw hole in turns so as to be further inserted into the first end of the hollow cylindrical conductor, the hollow cylindrical conductor, the first protrusion block, the electrically conductive plate, and the first segment are formed with an electrical transmission path therebetween.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe an upper contact assembly for integration in a fuse cutout according to the present invention, embodiments of the present invention will be described in detail with reference to the attached drawings hereinafter.

Figure 3:
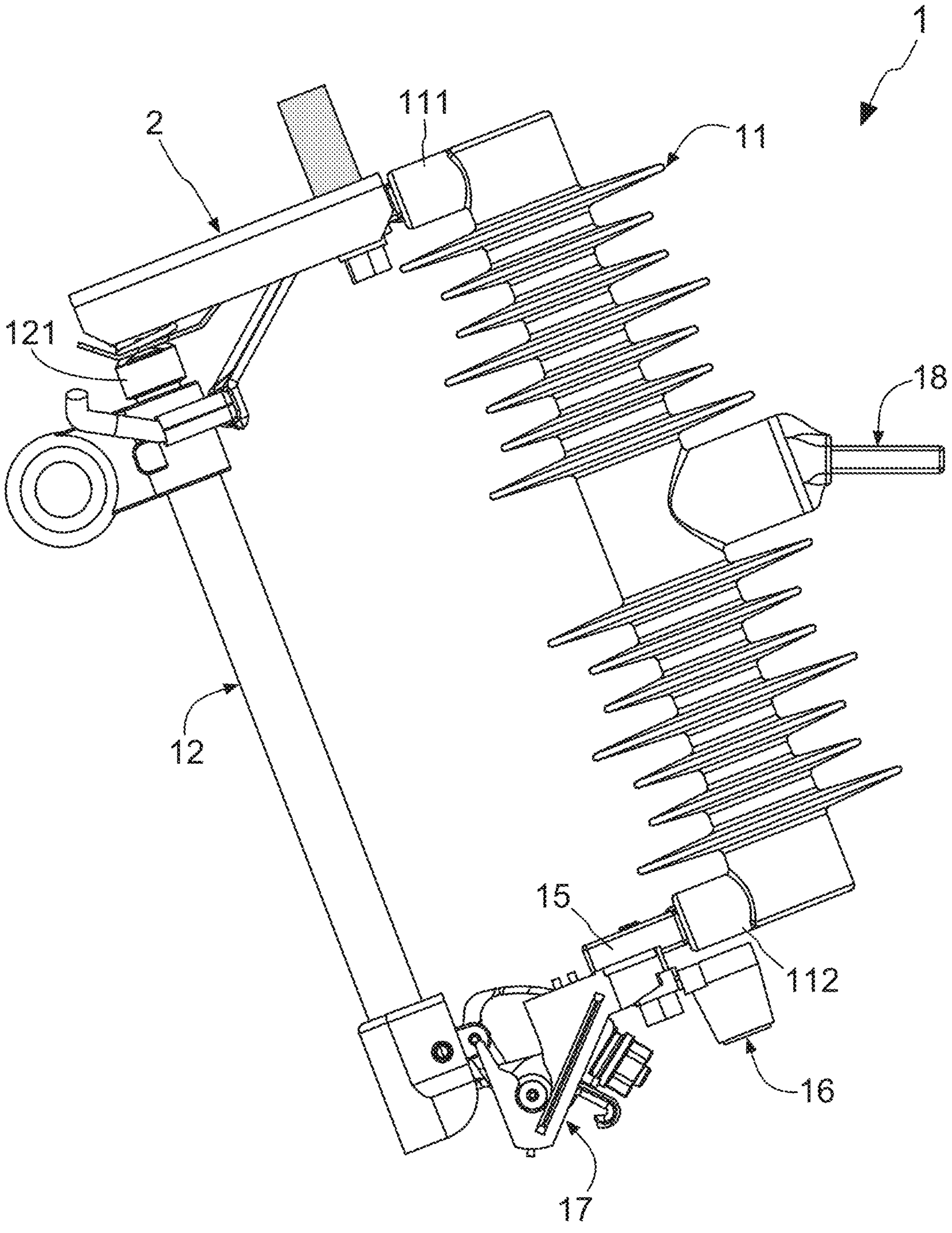
FIG. 3 shows a side view of a fuse cutout including an upper contact assembly according to the present invention.
Figure 4:
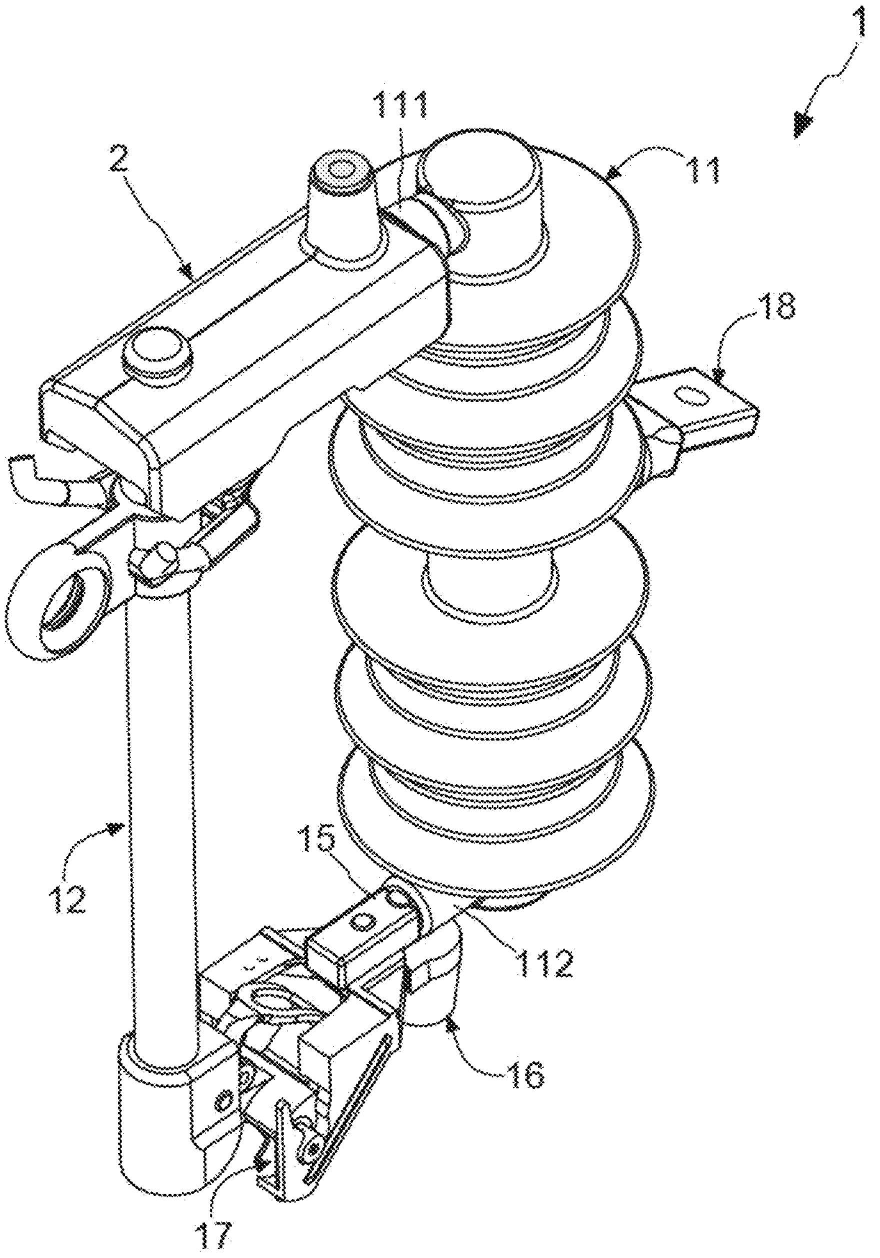
FIG. 4 shows a stereo diagram of the fuse cutout including the upper contact assembly according to the present invention.

FIG. 3 shows a side view of a fuse cutout 1 including an upper contact assembly 2 according to the present invention, and FIG. 4 illustrates a stereo diagram of the fuse cutout 1. With reference to FIG. 3 and FIG. 4, the fuse cutout 1 comprises: an insulator 11, a fuse tube assembly 12, an upper contact assembly 2 according to the present invention, a lower contact assembly 17, a lower terminal unit 16, and a mounting member 18, of which the insulator 11 has an upper connection portion 111 and a lower connection portion 112, and the upper contact assembly 2 and the lower contact assembly 17 are connected to the upper connection portion 111 and a lower connection portion 112, respectively. As described in more detail below, an upper electrically conductive member 14 extends out of the upper connection portion 111, and a lower electrically conductive member 15 extends out of the lower connection portion 112. Particularly, the upper contact assembly 2 of the present invention is connected to the upper electrically conductive member 14, and is adapted for being further connected with an overhead feeder electric wire. On the other hand, the lower terminal unit 16 is connected to the lower electrically conductive member 15, and is adapted for being further connected with an electric wire that is also connected to a primary side of a distribution transformer. Moreover, a fuse wire of the fuse tube assembly 12 and the lower terminal unit 16 are both connected to the lower contact assembly 17.

Figure 5:
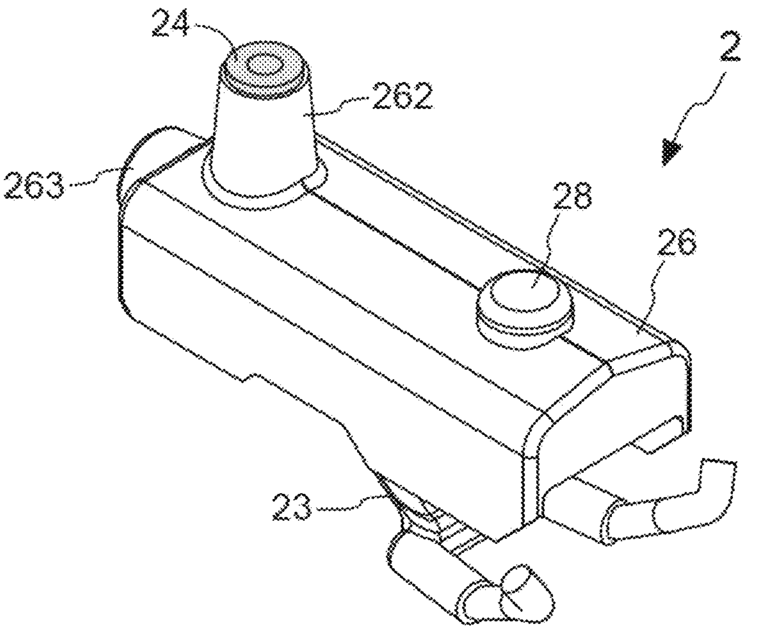
FIG. 5 shows a first stereo diagram of the upper contact assembly according to the present invention.
Figure 6:
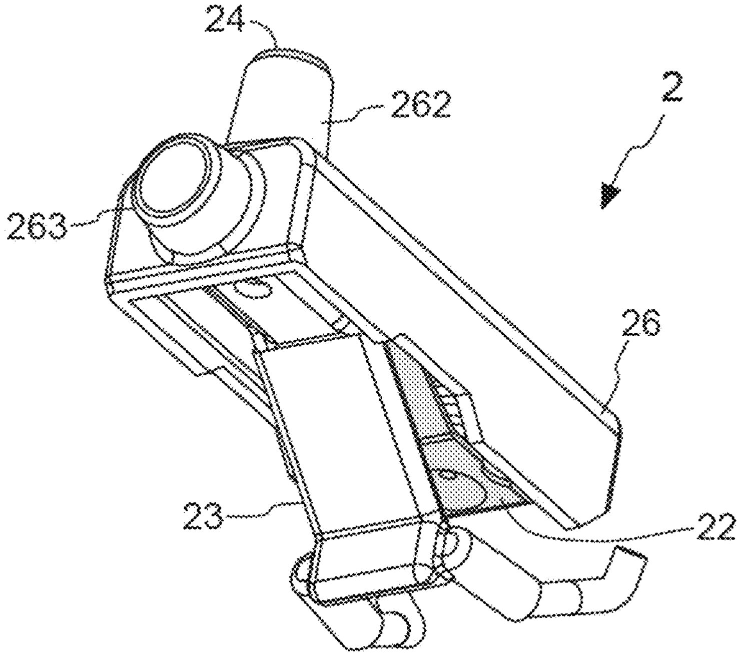
FIG. 6 shows a second stereo diagram of the upper contact assembly according to the present invention.
Figure 7:
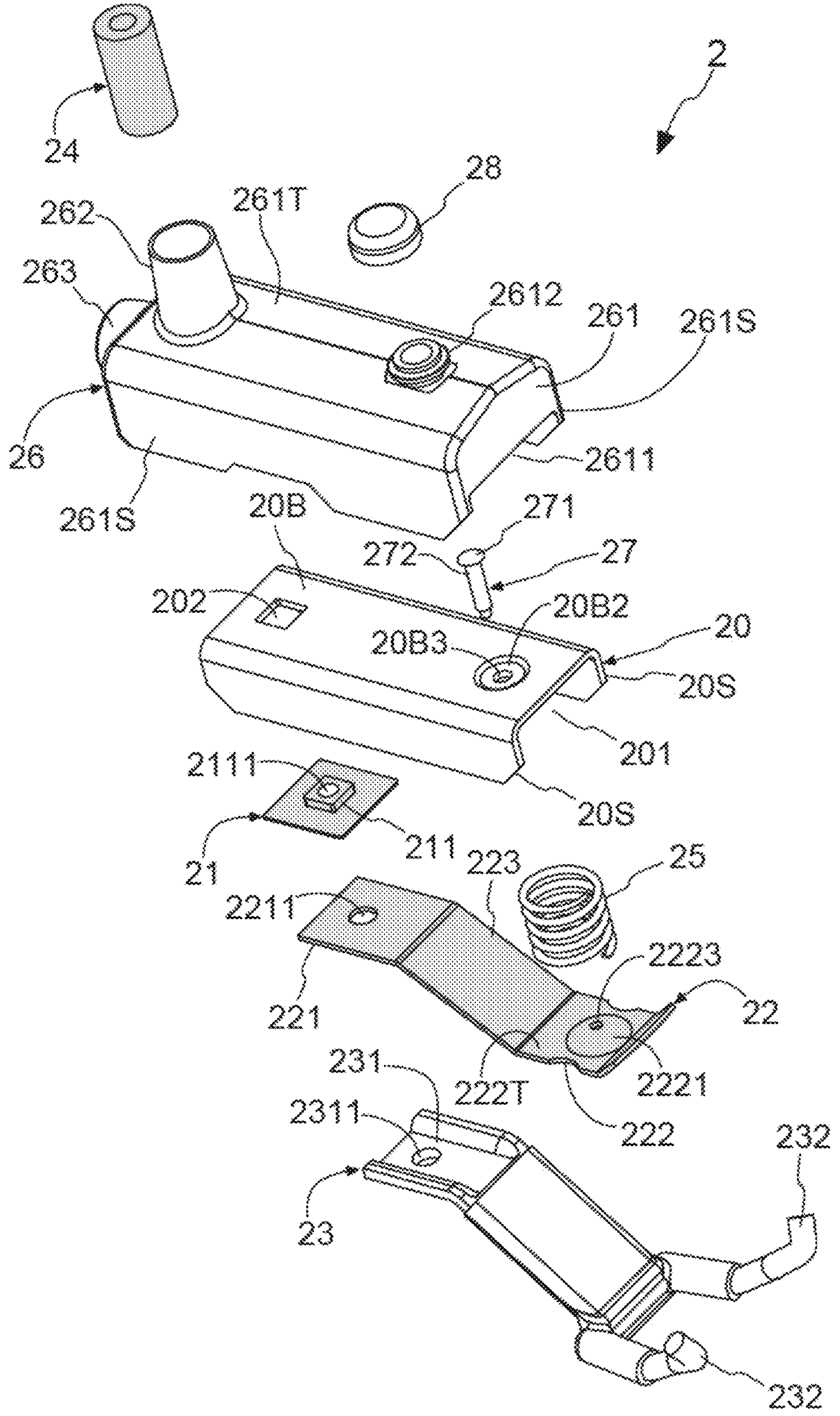
FIG. 7 shows a first exploded view of the upper contact assembly according to the present invention.
Figure 8:
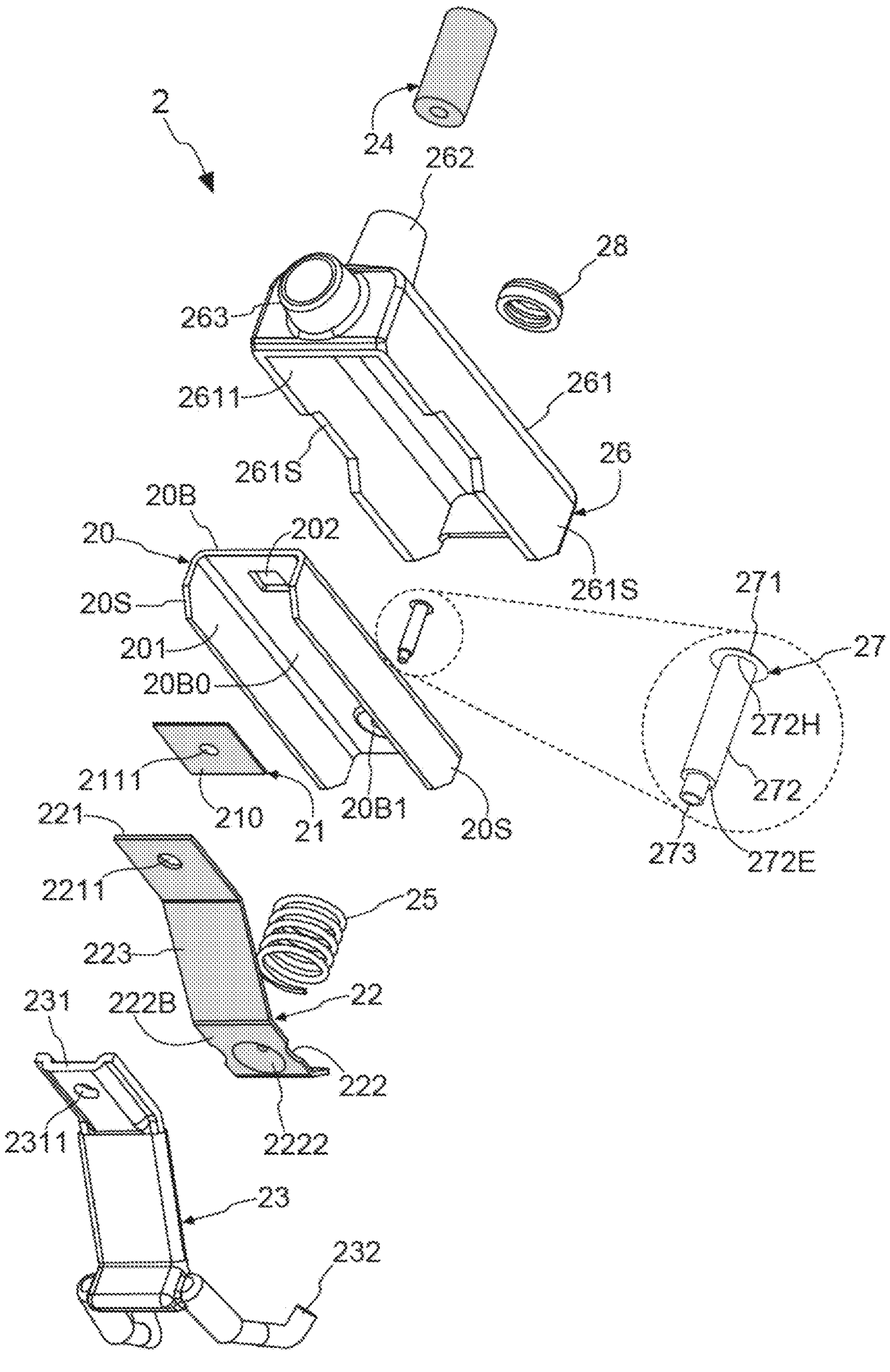
FIG. 8 shows a second exploded view of the upper contact assembly according to the present invention.

FIG. 5 and FIG. 6 show a first stereo diagram and a second stereo diagram of the upper contact assembly 2 according to the present invention, respectively. Moreover, FIG. 7 and FIG. 8 illustrate a first exploded view and a second exploded view of the upper contact 2, respectively. With reference to FIG. 5, FIG. 6, FIG. 7, and FIG. 8, the upper contact assembly 2 comprises: a metal member 20, an electrically conductive plate 21, a sheet metal spring 22, a support unit 23, a hollow cylindrical conductor 24, a compression spring 25, an upper cover 26, and a limit unit 27. According to the present invention, the metal member 20 consists of a bottom plate 20B and two side plates 20S connected to the bottom plate 20B, in which the bottom plate 20B is provided with an aperture 202 thereon, and a bottom surface of the bottom plate 20B and the two side plates 20S are formed with a first accommodation space 201 therebetween. In addition, the aperture 202 is in communication with the first accommodation space 201. As described in more detail below, the electrically conductive plate 21 is provided with a first protrusion block 211 thereon, and is disposed in the first accommodation space 201. Particularly, the electrically conductive plate 21 is also attached to the bottom surface of the metal member 20, thereby making the first protrusion block 211 be exposed out of the bottom plate 20B via the aperture 202. As FIG. 7 and FIG. 8 show, the first protrusion block 211 is formed with a first screw hole 2111 therein, and the first screw hole 2111 passes through the first protrusion block 211 and the electrically conductive plate 21.

With reference to FIG. 5, FIG. 6, FIG. 7, and FIG. 8, the sheet metal spring 22 comprises a first segment 221 and a second segment 222, of which the first segment 221 is disposed to be in contact with a bottom surface of the electrically conductive plate 21, and is provided with a first through hole 2211 thereon. In addition, the sheet metal spring 22 further comprises a slant segment 223 connected between the first segment 221 and the second segment 222, and the slant segment 223 has a tilt angle. On the other hand, the support unit 23 consists of a support member 231 and two hook-like members 232, wherein the support member 231 is formed with a second screw hole 2311 therein, and the second screw hole 2311 passes through the support member 231.

According to the present invention, the hollow cylindrical conductor 24 has a first end and a second end, and is disposed to be in contact with the first protrusion block 211 by the first end thereof. In contrast to the first end, the second end is adapted for being connected to the overhead feeder electric wire. With reference to FIG. 7 and FIG. 8, the bottom plate 20B has a first protrusion portion 20B1 formed on the bottom surface thereof, and a top surface and a bottom surface of the second segment 222 are formed with a second protrusion portion 2221 and a first recess 2222 thereon, respectively. As such, the compression spring 25 is able to be disposed between the bottom plate 20B and the second segment 222 after being connected to the first protrusion portion 20B1 and the second protrusion portion 2221 by a first end and a second end thereof. Moreover, a conductor head 121 of a fuse tube assembly 12 of the fuse cutout 1 can be embedded into the first recess 2222, so as to make a fuse wire of the fuse tube assembly 12 be electrically connected with the second segment 222. In addition, FIG. 7 and FIG. 8 further depict that the bottom plate 20B is provided with a second recess 20B2 thereon, and a second through hole 20B3 is formed in the second recess 20B2 to communicate with the first accommodation space 201. On the other hand, the second segment 222 is provided with a third through hole 2223, and the third through hole 2223 passes through the first recess 2222 and the second protrusion portion 2221.

Figure 9:
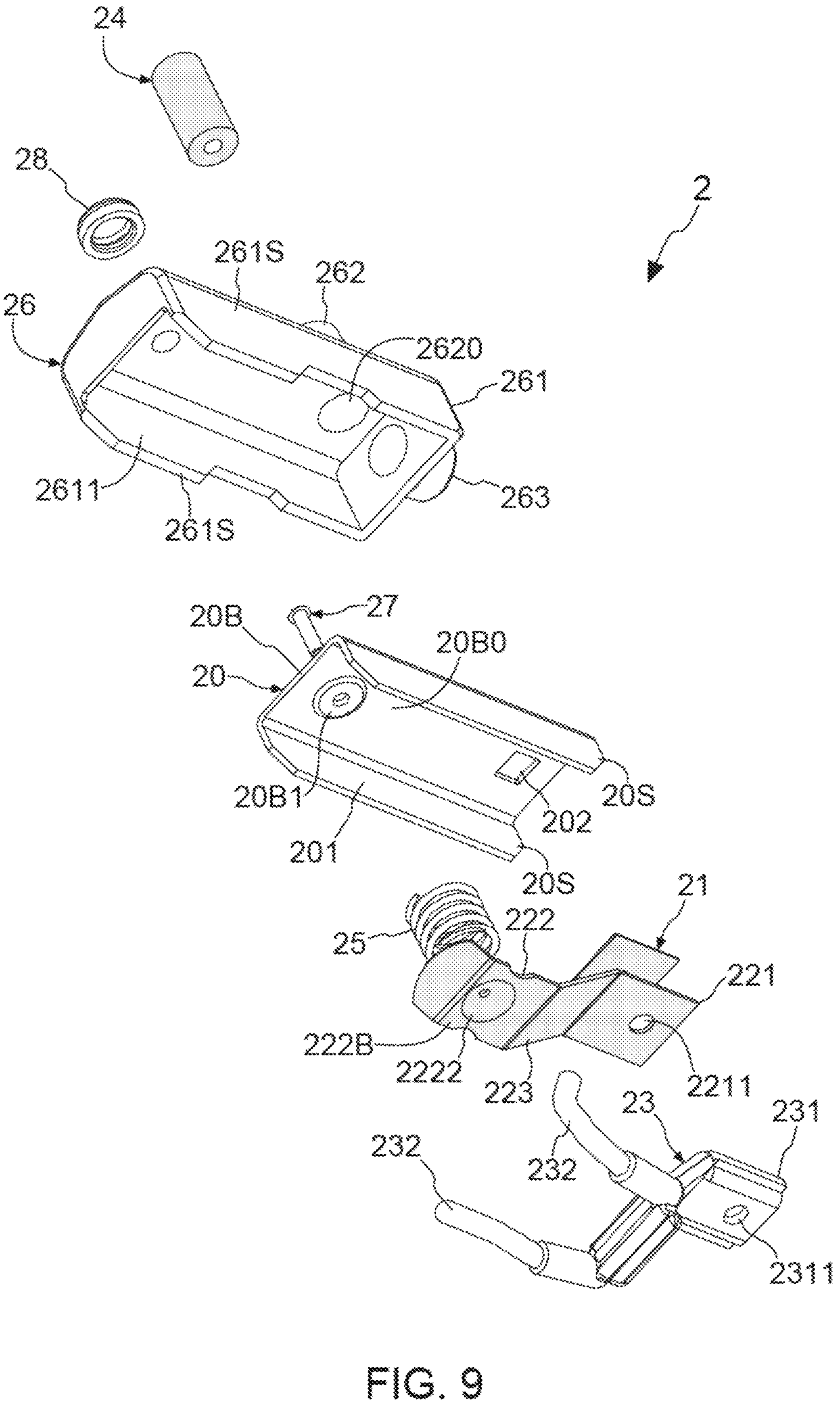
FIG. 9 shows a stereo diagram of an insulator, an upper electrically conductive member, an electrically conductive plate, a sheet metal spring, a support unit, and a compression spring.
Figure 10:
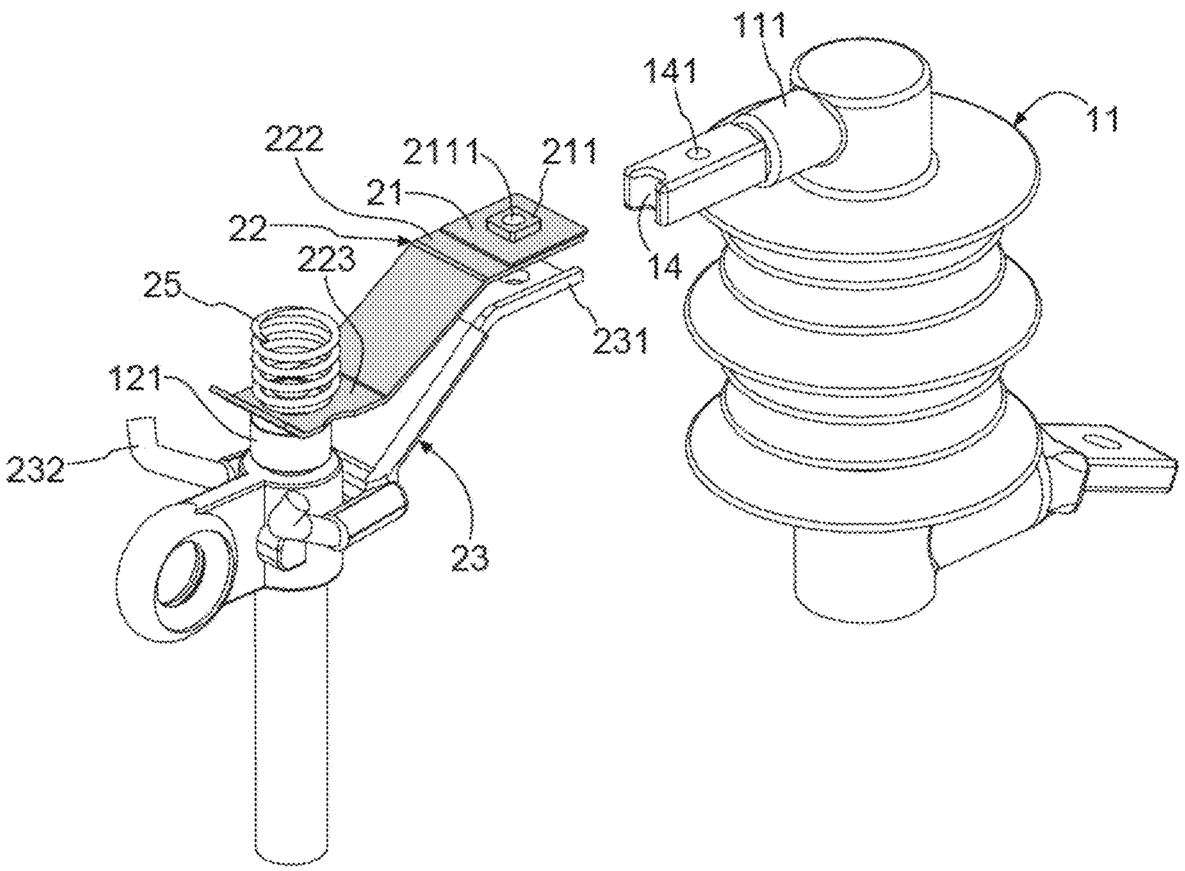

With reference to FIG. 9, there is shown a stereo diagram of the insulator 11, the upper electrically conductive member 14, the electrically conductive plate 21, the sheet metal spring 22, the support unit 23, and the compression spring 25. As FIG. 5, FIG. 6, FIG. 7, FIG. 8, and FIG. 9 show, the upper electrically conductive member 14 of the fuse cutout 1 is disposed on the support member 231, and the upper electrically conductive member 14 is provided with a third screw hole (not shown) therein, wherein the third screw hole passes through the upper electrically conductive member 14. By such design, after driving a bolt to pass through the second screw hole 2311 of the support member 231, the first through hole 2211 of the first segment 221, and the first screw hole 2111 in turns so as to be further inserted into the first end of the hollow cylindrical conductor 24, the hollow cylindrical conductor 24, the first protrusion block 211, the electrically conductive plate 21, and the first segment 221 are formed with an electrical transmission path therebetween. Therefore, an electric wire connected to a second end of the hollow cylindrical conductor 24 is able to conduct a high-power electrical transmission through the electrical transmission path.

As described in more detail below, the upper cover 26 comprises: an accommodation body 261 having a second accommodation space 2611, a ferrule 2612, a first hallow cylinder member 262, and a second hallow cylinder member 263, in which the ferrule 2612 is disposed on a top surface of the accommodation body 261 for communicating with the second accommodation space 2611, and is covered by a cap cover 28. On the other hand, the first hallow cylinder member 262 is disposed on the top surface of the accommodation body 261, so as to communicate with the second accommodation space 2611 by a first opening thereof. Moreover, the second hallow cylinder member 263 is disposed on a side surface of the accommodation body 261, and is in communication with the second accommodation space 2611. As FIG. 5, FIG. 6, FIG. 7, and FIG. 8 show, the metal member 20, the electrically conductive plate 21, the sheet metal spring 22, the support member 231 of the support unit 23, and the compression spring 25 are positioned in the second accommodation space 2611, and the hollow cylindrical conductor 24 is disposed in the first hallow cylinder member 262. It is worth further explaining that, the second hallow cylinder member 263 is adapted for being connected to the upper connection portion 111 of the insulator 11 of the fuse cutout 1.

With reference to FIG. 7 and FIG. 8, the limit unit 27 consists of a rod member 272, a head member 271 connected to a top of the rod member 272, and a pin member 273 connected to a tail of the rod member 272. According to the present invention, the pin member 273 is inserted into the third through hole 2223, the rod member 272 passes through the second through hole 20B3, and the head member 271 is positioned in the second recess 20B2. In addition, the rod member 272 has a first diameter, and the pin member 273 has a second diameter smaller than the first diameter. By such design, when the conductor head 121 is removed from the first recess 2222, the compression spring changes from a compressed state to a release state, and therefore a length of the compression spring 25 is elongated. On the contrary, in case of the fuse tube assembly 12 is rotated so as to make the conductor head 121 be received by the first recess 2222, the second segment 222 moves upwardly because of the propping of the conductor head 121, and the second segment 222 stops moving until the second protrusion portion 2221 is blocked by the bottom surface of the rod member 272.

Figure 1:
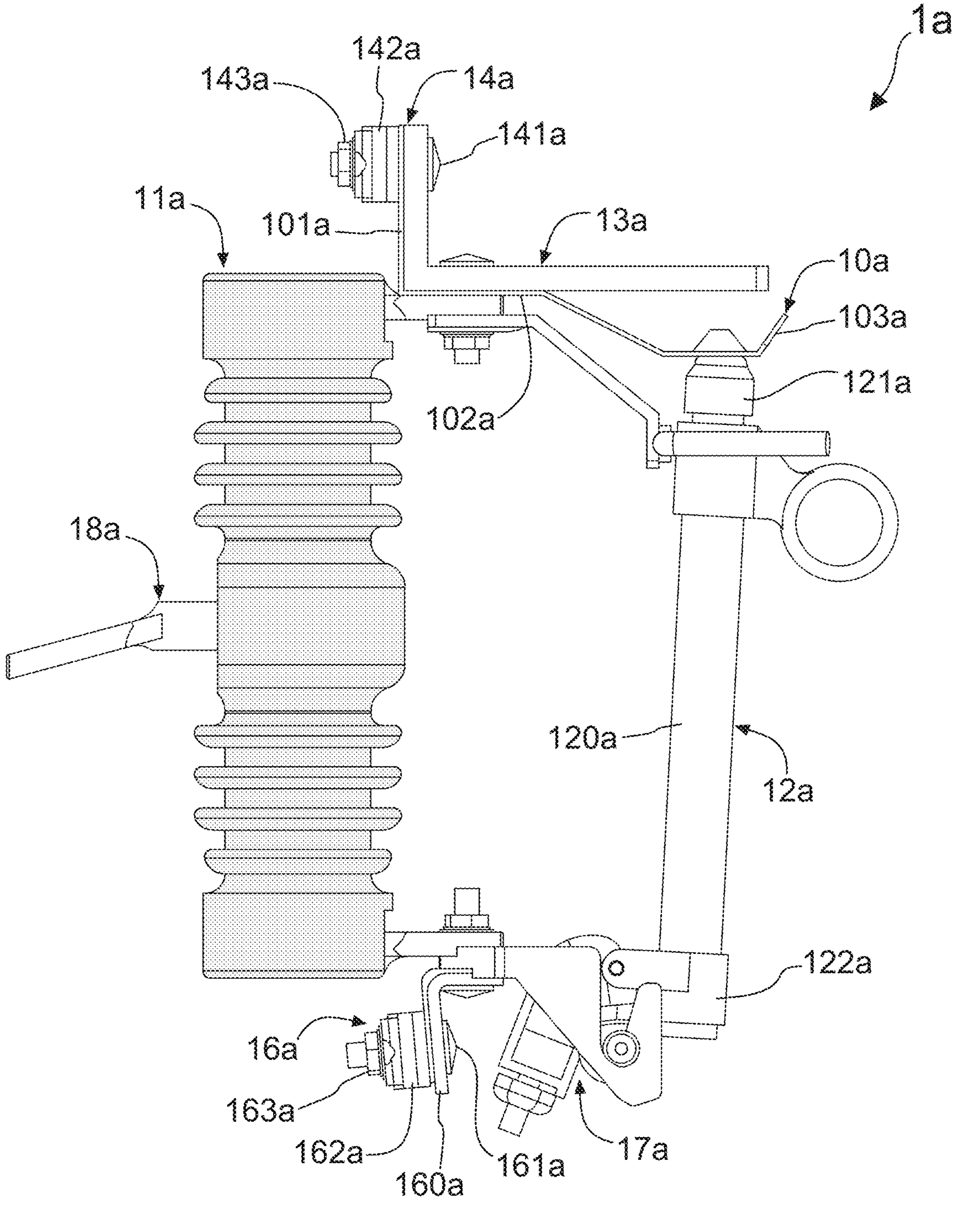
FIG. 1 (Prior art)
FIG. 1 shows a side view of a conventional fuse cutout.
Figure 2:
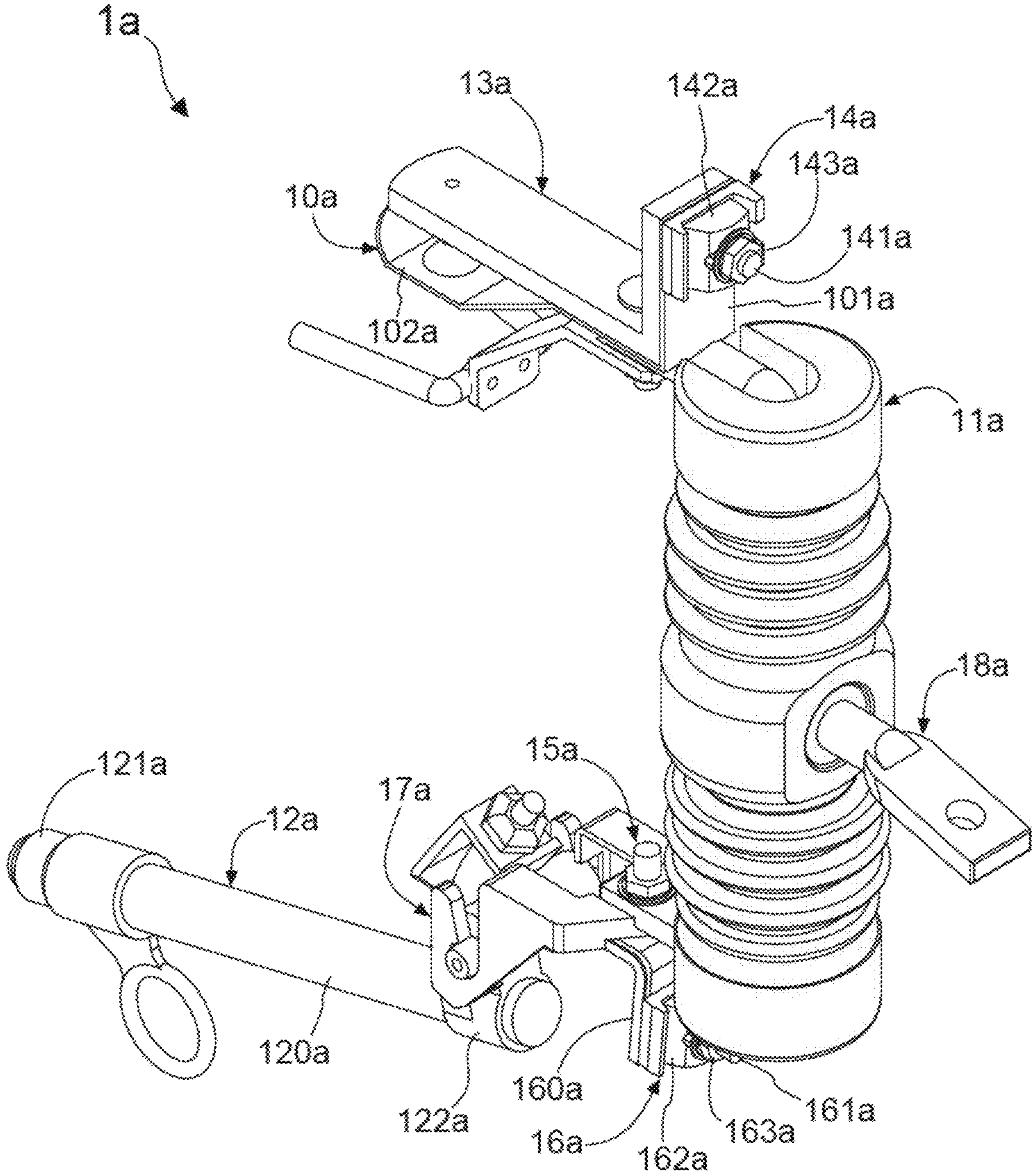
FIG. 2 (Prior art)
FIG. 2 shows a stereo diagram of the conventional fuse cutout.

Therefore, through above descriptions, all embodiments and their constituting elements of the upper contact assembly 2 for integration in the fuse cutout 1 have been introduced completely and clearly. In summary, the present invention includes the advantages of:

(1) the present invention provides an upper contact assembly 2 for integration in a fuse cutout 2 instead of the upper contact member 13*a*, the upper terminal unit 14*a* and the sheet metal spring 10*a* shown as FIG. 1. The upper contact assembly 2 comprises: a metal member 20, an electrically conductive (EC) plate 21, a sheet metal spring 22, a support unit 23, and a hollow cylindrical (HC) conductor 24, in which the metal member has an accommodation space 201, and the EC plate 21, the sheet metal spring 22, and a supporting member 231 of the support unit 23 are disposed in the accommodation space 201. Moreover, the sheet metal spring 22 is set to be in contact with a bottom of the EC plate 21, and the metal member 20 is provided with an aperture on a top thereof, such that a protrusion block 211 of the EC plate 21 is exposed out of the metal member via the aperture. On the other hand, the HC conductor 24 is vertically disposed on the top of the metal member 20, so as to be in contact with the protrusion block 211 by a first end thereof. As such, the HC conductor 24, the protrusion block 211, the EC plate 21, and the sheet metal spring 22 are formed with an electrical transmission path therebetween, such that an overhead feeder electric wire is allowed to conduct a high-power electrical transmission through the ET path after being connected to a second end of the HC conductor 24.

Moreover, the above description is made on embodiments of the present invention. However, the embodiments are not intended to limit the scope of the present invention, and all equivalent implementations or alterations within the spirit of the present invention still fall within the scope of the present invention.

What is claimed is:

1. An upper contact assembly for integration in a fuse cutout, comprising:

a metal member, comprising a bottom plate provided with an aperture thereon and two side plates connected to the bottom plate, wherein a bottom surface of the bottom plate and the two side plates are formed with a first accommodation space therebetween, and the aperture is in communication with the first accommodation space;

an electrically conductive plate provided with a first protrusion block thereon, being disposed in the first accommodation space, and being attached to the bottom surface of the metal member so as to make the first protrusion block be exposed out of the bottom plate via the aperture; wherein the first protrusion block is formed with a first screw hole therein, and the first screw hole passes through the first protrusion block and the electrically conductive plate;

a sheet metal spring, comprising a first segment and a second segment, wherein the first segment contacts with a bottom surface of the electrically conductive plate, and is provided with a first through hole thereon;

a support unit, comprising a support member and two hook-like members, wherein the support member is formed with a second screw hole therein, and the second screw hole passes through the support member;

a hollow cylindrical conductor having a first end and a second end, being disposed to be in contact with the first protrusion block by the first end thereof, wherein the second end is adapted for being connected to an electric wire;

wherein an upper electrically conductive member of the fuse cutout is disposed on the support member, the upper electrically conductive member is provided with a third screw hole therein, and the third screw hole passes through the upper electrically conductive member;

wherein after driving a bolt to pass through the second screw hole of the support member, the first through hole of the first segment, and the first screw hole in turns so as to be further inserted into the first end of the hollow cylindrical conductor, the hollow cylindrical conductor, the first protrusion block, the electrically conductive plate, and the first segment are formed with an electrical transmission path therebetween.

2. The upper contact assembly of claim 1, wherein the sheet metal spring further comprises a slant segment connected between the first segment and the second segment, and the slant segment has a tilt angle.

3. The upper contact assembly of claim 2, wherein the bottom plate has a first protrusion portion formed on the bottom surface thereof, and a top surface and a bottom surface of the second segment are formed with a second protrusion portion and a first recess thereon, respectively.

4. The upper contact assembly of claim 3, wherein a compression spring is connected between the first protrusion portion and the second protrusion portion, and the first recess is adapted for receiving a conductor head of a fuse tube assembly of the fuse cutout.

5. The upper contact assembly of claim 4, further comprising an upper cover, comprising:

an accommodation body having a second accommodation space;

a ferrule, being disposed on a top surface of the accommodation body, and being in communication with the second accommodation space;

a first hallow cylinder member, being disposed on the top surface of the accommodation body, so as to communicate with the second accommodation space by a first opening thereof, and a second hallow cylinder member, being disposed on a side surface of the accommodation body, and being in communication with the second accommodation space;

wherein the metal member, the electrically conductive plate, the sheet metal spring, the support member of the support unit, and the compression spring are positioned in the second accommodation space, and the hollow cylindrical conductor is disposed in the first hallow cylinder member;

wherein the second hallow cylinder member is adapted for being connected to an upper connection portion of an insulator of the fuse cutout.

6. The upper contact assembly of claim 5, wherein the ferrule is covered by a cap cover.

7. The upper contact assembly of claim 5, wherein the bottom plate is provided with a second recess thereon, and a second through hole is formed in the second recess to communicate with the first accommodation space.

8. The upper contact assembly of claim 7, wherein the second segment is provided with a third through hole, and the third through hole passes through the first recess and the second protrusion portion.

9. The upper contact assembly of claim 8, further comprising a limit unit, comprising:

a rod member;

a head member connected to a top of the rod member; and a pin member connected to a tail of the rod member;

wherein the pin member is inserted into the third through hole, the rod member passes through the second through hole, and the head member is positioned in the second recess.

10. The upper contact assembly of claim 9, wherein the rod member has a first diameter, and the pin member has a second diameter smaller than the first diameter.

11. A fuse cutout, comprising: an insulator, a fuse tube assembly, an upper contact assembly connected to an upper connection portion of the insulator, a lower contact assembly connected to a lower connection portion of the insulator, a lower terminal unit, and a mounting member;

characterized in that said upper contact assembly comprises:

a metal member, comprising a bottom plate provided with an aperture thereon and two side plates connected to the bottom plate, wherein a bottom surface of the bottom plate and the two side plates are formed with a first accommodation space therebetween, and the aperture is in communication with the first accommodation space;

an electrically conductive plate provided with a first protrusion block thereon, being disposed in the first accommodation space, and being attached to the bottom surface of the metal member so as to make the first protrusion block be exposed out of the aperture; wherein the first protrusion block is formed with a first screw hole therein, and the first screw hole passes through the first protrusion block and the electrically conductive plate;

a sheet metal spring, comprising a first segment and a second segment, wherein the first segment contacts with a bottom surface of the electrically conductive plate, and is provided with a first through hole thereon;

a support unit, comprising a support member and two hook-like members, wherein the support member is formed with a second screw hole therein, and the second screw hole passes through the support member;

a hollow cylindrical conductor having a first end and a second end, being disposed to be in contact with the first protrusion block by the first end thereof, wherein the second end is adapted for being connected to an electric wire;

wherein an upper electrically conductive member extends out of the upper connection portion so as to be disposed on the support member, the upper electrically conductive member is provided with a third screw hole therein, and the third screw hole passes through the upper electrically conductive member;

wherein after driving a bolt to pass through the second screw hole of the support member, the first through hole of the first segment, and the first screw hole in turns so as to be further inserted into the first end of the hollow cylindrical conductor, the hollow cylindrical conductor, the first protrusion block, the electrically conductive plate, and the first segment are formed with an electrical transmission path therebetween.

* * * * *